A. U. MERSHON.
CLUTCH.
APPLICATION FILED JULY 16, 1912.

1,062,491.

Patented May 20, 1913.

Witnesses
Harrison Ott

Inventor
Arthur U. Mershon
By Victor J. Evans
Attorney

UNITED STATES PATENT OFFICE.

ARTHUR U. MERSHON, OF COLORADO SPRINGS, COLORADO.

CLUTCH.

1,062,491.  Specification of Letters Patent.  Patented May 20, 1913.

Application filed July 16, 1912. Serial No. 709,713.

*To all whom it may concern:*

Be it known that I, ARTHUR U. MERSHON, a citizen of the United States, residing at Colorado Springs, in the county of El Paso and State of Colorado, have invented new and useful Improvements in Clutches, of which the following is a specification.

This invention relates to rope clutches and more particularly to that type of device which are adapted to be used in connection with package ties.

The principal object of the invention is to provide a simple and efficient device of this character which may be cheaply produced and which may be readily and conveniently operated.

Further objects of this invention will appear as the following specific description is read in connection with the accompanying drawing, which forms a part of this application, and in which:—

Figure 1:
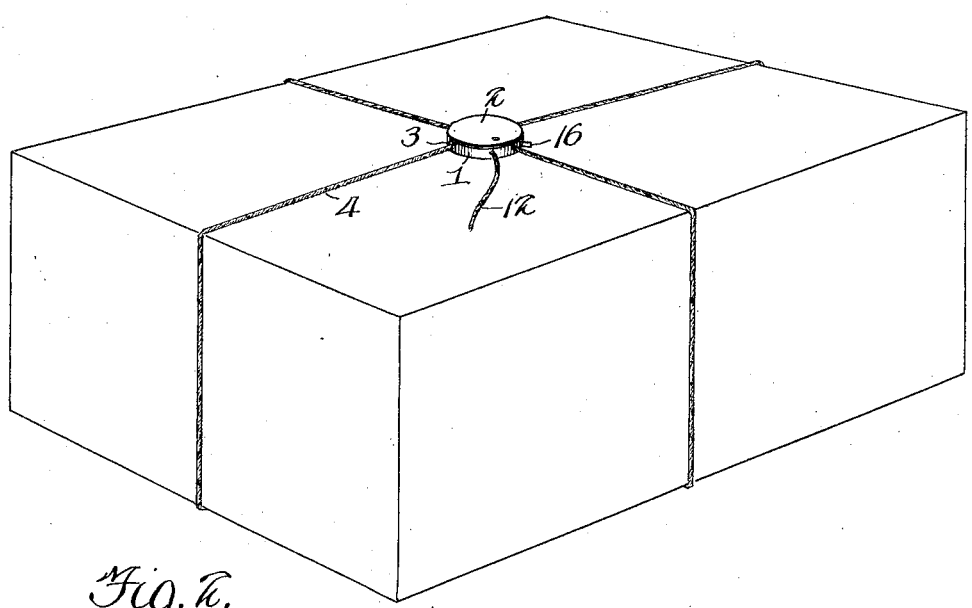
Figure 2:
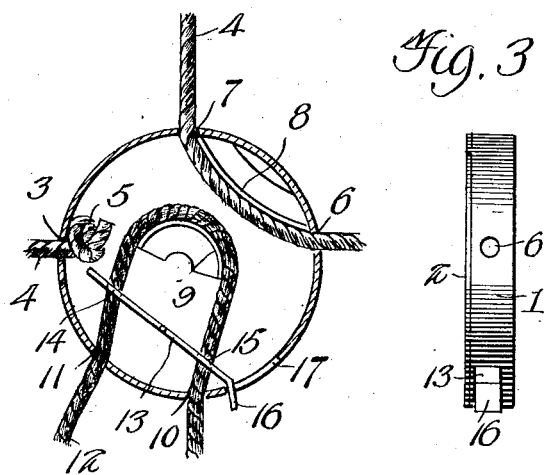
Figure 3:
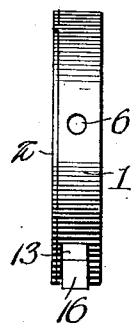

Figure 1 is a perspective view showing the device applied to package ties. Fig. 2 is a top plan view with the top plates removed. Fig. 3 is an edge view.

Referring more particularly to the drawing, 1 represents a circular casing which is closed by a top 2 and has formed in one side thereof an aperture 3 through which one terminal of the rope or cord 4 is adapted to pass, this end being knotted, as shown at 5, to prevent disconnection of the same from the casing. The opposite side of the casing is provided with an aperture 6 and between the apertures 3 and 6 is a similar aperture 7. Struck up from the bottom of the casing is an arcuate rib 8 which is arranged between the apertures 6 and 7 and is adapted to form an abutment or guide for the rope 4. In the center of the casing, an arcuate rib 9 is struck up from the casing and serves in the capacity of a tool or like device, the rope entering the casing through apertures 10 and 11 and extending around said rib, as shown. In order to hold the free end of the rope 12, there is pivoted between the rib 9 and the apertures 10 and 11 a lever 13 having apertures 14 and 15 adapted to receive the rope 4, as shown in Fig. 2. These apertures are preferably cut with a bevel, as shown in said figure, and the lever is provided with an operating pin 16 which works in a slot 17 formed in the side of the casing. When the free end of the rope is pulled through the apertures 10 and 11 around the rib 9, the lever will be turned to a position where its inner end is adapted to engage the casing and thereby limit its movement. In this position, the walls of the apertures alone affect the rope, but when the free ends of the rope are released, the lever will be turned to the position shown in Fig. 2, whereupon the walls of the apertures will bind upon the rope and bite into the same, thus preventing its disconnection from the casing. The end walls of the slot, as will be of course understood, will form limiting stops for the exposed end of the lever.

In applying the device shown in Fig. 2 to a package, it will be of course understood that the rope 4 is permanently connected to the casing by means of the knot 5. Upon placing the casing in the center of the package, the rope is wound around the package either longitudinally or transversely and then passed through the apertures 6 and 7 and extended around the package at right angles to the first wrap. The end is then passed through the aperture 10 in the casing, through the aperture 14 in the lever, and out through the aperture 11 in the casing. Upon pulling the free end of the rope, the same will be caused to slide through the apertures 6 and 7 and also through the apertures 10, 14 and 11, and around the rib 9. When released, the friction of the rope against the walls of the apertures 14 and 15 will cause the lever to tilt to the position shown in Fig. 2, in which position, the rope will be clutched, as will be readily understood, this action of course being entirely automatic.

What is claimed is:—

A rope clutch carrying device comprising a casing having a pair of diametrically arranged apertures in its side walls and other apertures, an arcuate rib struck up from the casing and arranged between one of said pair of apertures and one of said other apertures and adapted to guide a rope, a rope connected to said casing and passing through said apertures on opposite sides of the rib, a second arcuate rib struck up from the center of the casing and arranged to permit the free end of the rope to pass through the opposite aperture of said pair of apertures and around said second arcuate rib to form a loop and out one of said other apertures, a lever pivoted in the casing between said last-named apertures and the last-named arcuate rib and having apertures to receive the opposite sides of the rope loop, said lever having an offset end exposed through the casing.

In testimony whereof I affix my signature in presence of two witnesses.

ARTHUR U. MERSHON.

Witnesses:
 JESSIE G. DOUGLASS,
 NELLIE HANNA.

Copies of this patent may be obtained for five cents each, by addressing the "Commissioner of Patents, Washington, D. C."